United States Patent [19]
Riza

[11] Patent Number: 5,274,381
[45] Date of Patent: Dec. 28, 1993

[54] OPTICAL CONTROLLER WITH INDEPENDENT TWO-DIMENSIONAL SCANNING

[75] Inventor: Nabeel A. Riza, Clifton Park, N.Y.

[73] Assignee: General Electric Co., Syracuse, N.Y.

[21] Appl. No.: 955,165

[22] Filed: Oct. 1, 1992

[51] Int. Cl.$^5$ ............... H01Q 3/22; H04B 10/12; G02F 1/07

[52] U.S. Cl. ................ 342/368; 342/372; 359/173; 359/191; 359/238; 385/7

[58] Field of Search ............ 342/368, 372–375; 385/1, 7, 32; 359/191, 192, 285, 287, 577, 578, 173, 140, 238

[56] References Cited

U.S. PATENT DOCUMENTS

| 5,117,239 | 5/1992 | Riza | 342/375 |
| 5,187,487 | 2/1993 | Riza | 342/372 |
| 5,191,339 | 3/1993 | Riza | 342/372 |

OTHER PUBLICATIONS

Nabeel A. Riza, An Acoustooptic Phased Array Antenna Beamformer With Independent Phase and Carrier Control Using Single Sideband Signals, IEEE Photonics Technology Letters, vol. 4, No. 2, Feb. 1992.

T. Day et al., Active Frequency Stabilization of a 1.062 μm, Nd:GGG, Diode-Laser-Pumped Nonplanar Ring Oscillator to Less Than 3 Hz of Relative Linewidth, Optics Letters, Feb. 15, 1990, vol. 15, No. 4.

Riza, "Acoust-optic Control of Phased Array Antennas", May 1990, GE Technical Information Series.

Primary Examiner—Gregory C. Issing
Attorney, Agent, or Firm—Stephen A. Young; Paul Checkovich

[57] ABSTRACT

A liquid crystal and acousto-optic based control system for phased array antennas provides independent control of scanning along two axes of the antenna. The optical control system includes a laser source providing polarized laser beams processed in an in-line interferometric optical architecture that uses two acousto-optic deflectors (AODs) driven by separate sidebands of a microwave signal that is a mixture of a drive frequency corresponding to the desired carrier frequency and a variable control frequency for determining a selected sideband frequency. The AODs and associated polarization rotators generate a plurality of optical signal pairs, each pair having one first order positive doppler shifted light beam deflected by a first sideband drive signal and one first order negative doppler shifted light beam deflected by a second sideband drive signal, the positive and negative doppler shifted beams being respectively orthogonally linearly polarized and traveling along almost collinear paths. A further optical phase delay is introduced in a predetermined one of the light beams in each optical signal pair via electrical control of an array of liquid crystal pixels in a spatial light modulator (SLM). After passing through the SLM, orthogonally-polarized light beams in each pair are combined; this signal is then used via heterodyne detection by a respective photodiode to generate an electrical output signal.

30 Claims, 2 Drawing Sheets

OPTICAL CONTROLLER WITH INDEPENDENT TWO-DIMENSIONAL SCANNING

RELATED APPLICATIONS AND PATENTS

This application is related to the co-pending applications of N. A. Riza entitled "Phased-Array Antenna Controller", Ser. No. 07/847,155, filed Mar. 5, 1992, and allowed Sep. 14, 1992; and "A Compact Wide Tunable Bandwidth Phased Array Antenna Controller", Ser. No. 07/847,156, filed Mar. 5, 1992, and allowed Sep. 14, 1992, both of which are assigned to the assignee of the present invention and are incorporated herein by reference.

BACKGROUND OF THE INVENTION

This invention relates generally to signal processing systems and more particularly to beamforming controls for phased array antenna systems.

Phased array antenna systems employ a plurality of individual antennas or subarrays of antennas that are separately excited to cumulatively produce a transmitted electromagnetic wave that is highly directional. The radiated energy from each of the individual antenna elements or subarrays is of a different phase, respectively, so that an equiphase beam front, or the cumulative wave front of electromagnetic energy radiating from all of the antenna elements in the array, travels in a selected direction. The difference in phase or timing between the antenna activating signals determines the direction in which the cumulative beam from all of the individual antenna elements is transmitted. Analysis of the phases of return beams of electromagnetic energy detected by the individual antennas in the array similarly allows determination of the direction from which a return beam arrives.

In a phased array antenna system used as a radar, for example, it is desirable to control the electromagnetic energy pattern in two dimensions (i.e., along two axes of the antenna array that are orthogonal to one another), typically identified as elevation and azimuth. In most radar systems it is further desirable to rapidly scan the elevation as the radar system simultaneously scans the azimuth. Thus radar system performance can be enhanced with a beam control system that allows for a very rapid scanning along one axis (e.g., the vertical axis or elevation) while still having a rapid and reliable scanning along the other axis (e.g., the horizontal axis or azimuth).

Beamforming, or the adjustment of the relative phase of the actuating signals for the individual antennas (or subarrays of antennas), has conventionally been accomplished by electronically shifting the phase of actuating signals or by introducing a time delay in actuating signals for selected antenna elements to sequentially excite the antenna elements to generate the desired direction of beam transmission from the antenna. Opto-electronic processing of beamforming signals for phased array antennas offers numerous advantages over conventional electronic-only processing by reason of superior performance of optical control systems, including increased bandwidth, compactness, and signal stability. Examples of such opto-electronic systems are disclosed in U.S. Pat. No. 5,117,239 of N. Riza issued May 26, 1992, and in the copending applications referenced above, all of which are assigned to the assignee of the present invention and are incorporated herein by reference.

Ideally, a phased array antenna control system should have the ability to rapidly scan in elevation for a given azimuth scan rate, and should be light, compact, relatively immune to undesirable electromagnetic radiation, and straightforward to fabricate, operate, and maintain. Such a system also desirably has a wide antenna tunable bandwidth, and inertialess, motion-free high resolution beam scanning ability with application-dependent slow-to-fast scanning speeds.

It is additionally advantageous to have an analog beamforming control system that allows a large number of possible phase shift combinations. Such an analog system is in contrast to digital phase control from electronic phase shifters, which provide a fixed number of possible phase actuation signals. This limited number of possible actuation signals in turn limits the phase resolution achievable with the microwave devices, thus limiting the angular resolution of the scanned antenna beam. Further, in conventional electronically controlled phased arrays, the digital microwave phase shifters are also typically used for correcting phase errors that result due to the other microwave devices in the system. Because of the digital nature of the phase shifters, the phase errors can only be partially cancelled.

Optical control systems can be advantageously used to generate control signals for phased array antennas. For example, an optical control system can use heterodyne detection between respective phase-shifted light beams in an optical signal pair to generate a scanning interference phase pattern. Such a system, using a liquid crystal pixel array for generating phase delays in one light beam of an optical signal pair is disclosed in commonly assigned, application U.S. Pat. No. 5,191,339. Another method of generating a scanning pattern based on interference between light beam pairs is described in the article authored by N. Riza entitled "An Acoustoopic Phased Array Antenna Beamformer with Independent Phase and Carrier Control Using Single Sideband Signals", appearing in *IEEE Photonics Technology Letters*, Vol. 4, No. 2, February 1992.

It is accordingly an object of this invention to provide an optical signal processing system for controlling scanning arrays that can simultaneously generate two-dimensional analog phase-based modulo $2\pi$ phased array antenna beam control signals.

It is a further object of this invention to provide a phase-based antenna controller that is relatively compact, lightweight and has an inertialess two-dimensional beam scanning structure.

Another object of this invention is to provide a two-dimensional phase-based antenna controller that has a wide (i.e., in the GHz range) tunable antenna bandwidth with stable phase-control and an independent, analog, phase-error calibration capability for all the elements in the array.

SUMMARY OF THE INVENTION

In accordance with the present invention, an optical signal control system generates a plurality of light beam pairs arranged in a two-dimensional processing pattern. The relative phase between light beams in each pair is modulated to generate optical interference patterns which are detected by heterodyne detection devices to produce electrical signals for governing transmit and receive electromagnetic radiation patterns of a phased array antenna. The optical control system comprises a source of coherent, linearly polarized light coupled to an acousto-optic control system for generating the plurality of optical signal pairs, an optical phase modulating device, and a transceiver module having a heterodyne detection device to detect the relative phase shift between light beams in each optical signal pair.

Each optical signal pair comprises two light beams, one of which has a first order negative doppler shift and one of which has a first order positive doppler shift. The acousto-optic control system includes a first acousto-optic deflector (AOD) driven by a first sideband drive signal and a second AOD driven by a second sideband drive signal; a microwave drive system to generate the first and second sideband drive signals corresponding to a selected carrier frequency and a selected variable control frequency; a 1:1 imaging system through which light beams emanating from the first to the second AOD pass; and a 90° polarization rotator.

The light source and an associated lens are disposed so that light beams are incident at the Bragg angle on the first AOD (i.e., the light beams are "Bragg matched" to the AOD), resulting in some of the incident beams passing through undiffracted and some of the beams being diffracted and undergoing a first order positive doppler shift. The amount of the first order positive doppler shift in the first AOD is determined by the first sideband frequency (e.g., the upper sideband of the mixture of the selected carrier frequency and the selected variable control frequency) of the microwave signal driving the AOD. The polarization rotator is disposed at the focal point between imaging lenses in the 1:1 imaging system so that the undiffracted light beams pass therethrough and emerge having a linear polarization orthogonal to that of the first order positive doppler shifted light beams. The 1:1 imaging system is further disposed so that the polarization-rotated light beams are incident on the second AOD at the Bragg angle such that they are diffracted and undergo a first order negative doppler shift; the amount of the negative doppler shift in the second AOD is determined by the second sideband frequency (e.g., the lower sideband of the mixed carrier and selected variable control frequency). These first order negative doppler shifted light beams emerge passing along almost collinear paths with the first order positive doppler shifted light beams such that positive and negative doppler shifted light beams are considered in pairs.

The optical phase modulating device comprises a two-dimensional array of liquid crystal devices disposed so that optical signal pairs passing from the acousto-optic control system pass into respective ones of the liquid crystal pixels. The pixels are electrically controlled to selectively shift the phase of one of the light beams (having a predetermined linear polarization) in each of the optical pairs while the light beam of the opposite polarization in the optical signal pair passes without undergoing a phase shift dependent on the electrical signal applied to the pixel.

the transceiver module is optically coupled to the optical phase modulating device to receive the plurality of processed optical signal pairs. The heterodyne detection device is disposed to detect the optical interference patterns resulting from the selected difference in phase or deflection angle between the positive and the first order negative doppler shifted light beams in each optical signal pair. The heterodyne detection device advantageously is a two-dimensional photodiode array fed by a two-dimensional fiber array. Each of the electrical beamforming signals corresponds to a respective antenna element. The photodiode array is typically electrically coupled through transmit/receive circuitry to control the scanned electromagnetic radiation pattern in both the transmit and receive modes of a phased array antenna.

A method of processing optical signals to control a phased array antenna in accordance with this invention includes the steps of passing a plurality of coherent, linearly polarized light beams through an acousto-optic controller to generate a plurality of optical signal pairs arranged in a two-dimensional pattern, each of the pairs having two light beams which respectively have a first order positive and first order negative doppler shift; driving the acousto-optic system with a drive system so that the first order positive doppler shift of respective ones of the light beams corresponds to a first sideband of a mixture of the drive frequency and the selected variable control frequency, and the first order negative doppler shift corresponds to a second sideband of a mixture of the drive frequency and the variable control frequency so that relative phase differences are generated between respective ones of the light beams in each of the optical signal pairs along a first axis of the two-dimensional pattern; selectively shifting the phase of one of the light beams in each of the optical signal pairs having a predetermined linear polarization such that interference patterns in respective ones of optical signal pairs are created along a second axis of the two-dimensional pattern; detecting the interference between the relative phases of the two light beams in each of the plurality of optical signal pairs and generating a corresponding electrical beamforming signal; and controlling the transmit and receive electromagnetic radiation patterns of the phased array antenna using the electrical beamforming signals.

BRIEF DESCRIPTION OF THE DRAWINGS

The features of the invention believed to be novel are set forth in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE PREFERRED EMBODIMENT

Figure 1:
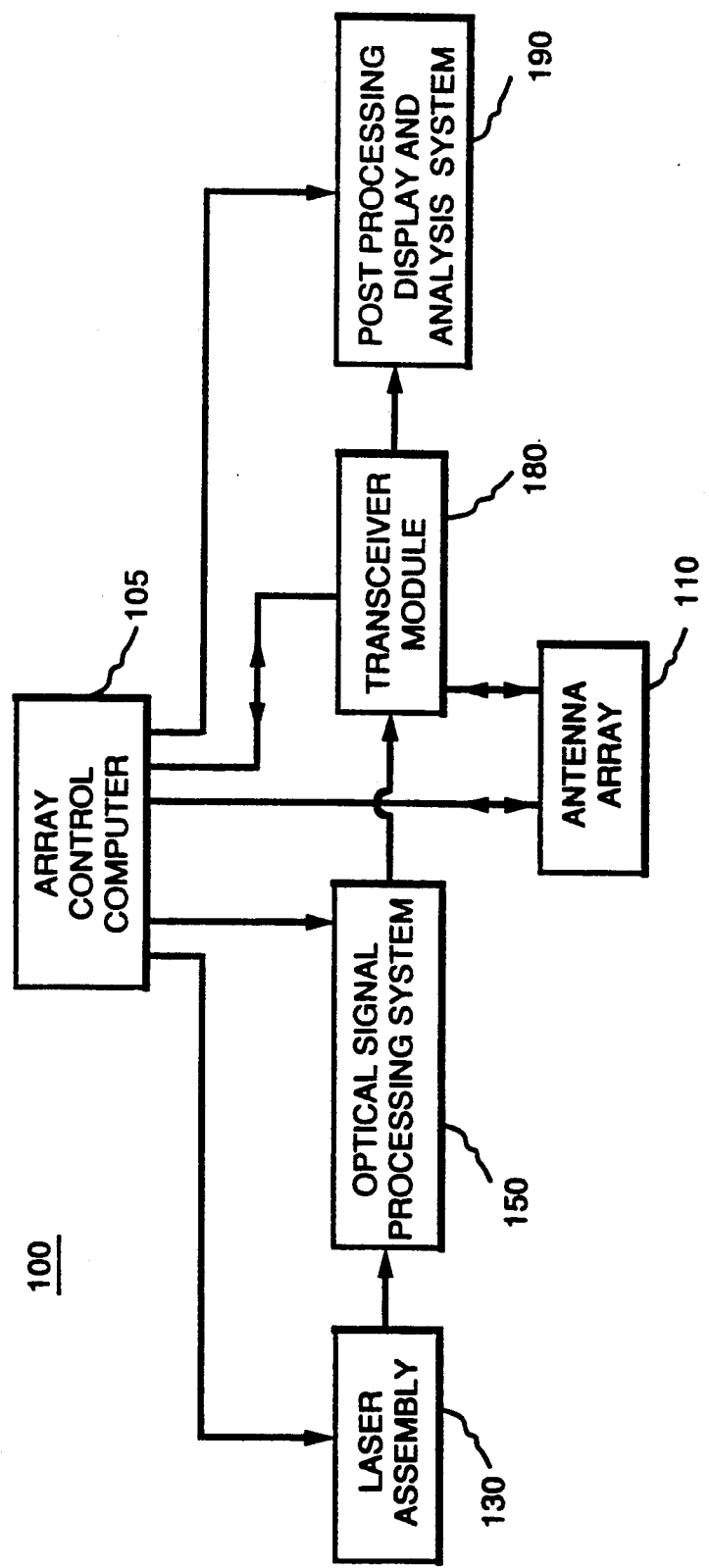
FIG. 1 is a block diagram of a phased array antenna system comprising the present invention.

In FIG. 1, a phased array antenna system 100 as used in a radar system or the like is shown comprising an array control computer 105, an antenna array 110, a laser assembly 130, an optical signal processing system 150, a transceiver module 180, and a post-processing system 190 for display and analysis. Array control computer 105 is coupled to and generates signals to control and synchronize the operation, described below, of the components listed above so that optical signal processing system 150 generates optical signals to control the transmit and receive electromagnetic radiation patterns of the antenna system.

Figure 2:
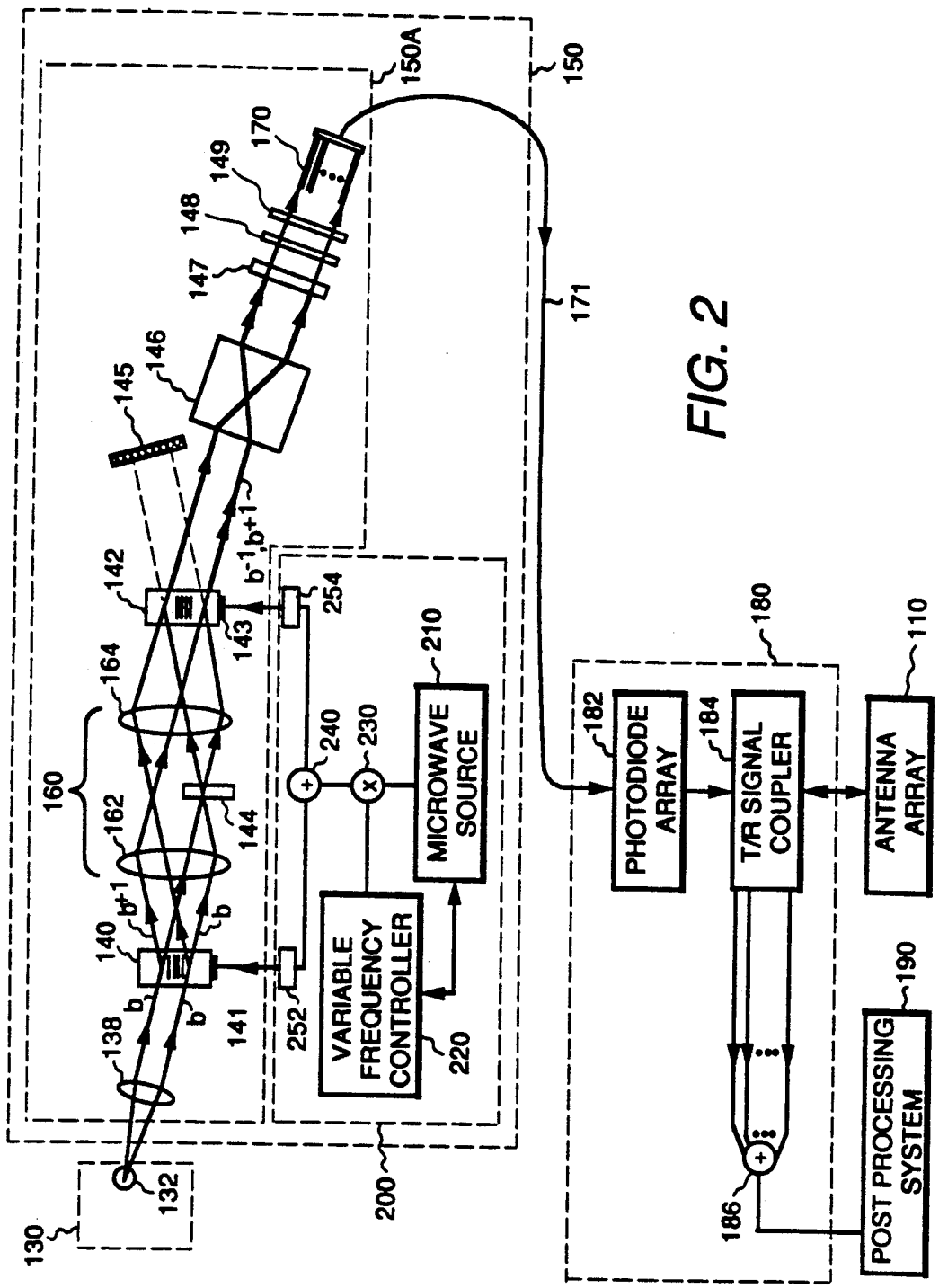
FIG. 2 is a part block and part schematic representation of a phased array antenna system including an optical signal control system of the present invention.

FIG. 2 illustrates in greater detail certain components of phased array antenna system 100 of FIG. 1. When the system operates in the transmit mode, electromagnetic energy is radiated into free space by antenna array 110, which typically comprises a plurality of antenna elements (not shown). The antenna elements are similarly used to detect electromagnetic energy returning to the antenna from free space and to generate corresponding electrical signals. As used herein, an antenna element may comprise one or more radiating devices (not shown), which, when excited by an electrical signal, radiate electromagnetic energy into free space. In a phased array system, the number and arrangement of the antenna elements are determined by the desired beamforming and detection capabilities for the array. For example, in a typical advanced phased array radar system used for target tracking, each face of a four-faced array comprises about 1,000 antenna elements.

Antenna array 110 is coupled to signal processing system 150 via a transceiver module 180, and a fiber optic array link 171. Transceiver module 180 is controlled by array control computer 105 (shown in FIG. 1) to select a transmit or a receive mode of operation for phased array antenna system 100. In the transmit mode, optical signals from signal processing system 150 are converted to electrical beamforming signals in transceiver module 180, which signals are used to drive the antenna elements to radiate electromagnetic energy into free space. In the receive mode, transceiver module 180 couples return electrical signals corresponding to the electromagnetic energy detected by the antenna elements to the electrical signals derived from signal processing system 150 to mix and filter the signals and thereby generate respective in-phase signals to be added and then directed to the post processing system 190 for display and analysis.

As illustrated in FIG. 2, optical signal processing system 150 comprises optical architecture 150A coupled to a microwave drive system 200 to generate the phase shifts in the drive signals for antenna array 110. As used herein, "optical architecture" refers to the combination of devices for manipulating the direction, diffraction, polarization, or the phase or amplitude of the light beams.

Laser assembly 130 is coupled to optical signal processing system 150 and generates linearly polarized coherent light beams. These light beams provide the input signal to the optical architecture of signal processing system 150 and are processed to generate the drive signals for antenna array 110. For the purpose of describing the present invention, it will be assumed that laser assembly 130 generates "p" polarized, i.e., vertically polarized light beams, although "s" polarized, i.e., horizontally polarized, light beams may similarly be used with appropriate adjustments in the optical architecture. Laser assembly 130 comprises a laser source 132, which is advantageously a semiconductor laser, but may be any type of laser beam generator that can provide beam intensities sufficient for operation of the optical signal processing system as described in this application. Laser source 132 is typically biased to generate continuous wave radiation, although it can alternatively be intensity modulated at the pulse repetition frequency (PRF) of the radar system.

Laser source 132 is optically coupled to a spherical lens 138 disposed so that it acts as an optical collimator to cause light beams passing from it to travel along parallel paths. In FIG. 2, two representative light beams "b" emanating from lens 138 are illustrated. Spherical lens 138 is optically coupled to a first acousto-optic deflector (AOD) 140. First AOD 140 is a Bragg cell, i.e., a device in which some number of light beams striking the device from a predetermined angle (Bragg angle) pass through the device undiffracted and some number are selectively diffracted and are doppler shifted dependent on the acoustic signal driving the crystal within the Bragg cell.

First AOD 140 comprises a transducer 141 that is electrically coupled to microwave drive system 200, which provides the acoustic drive signal to the transducer. First AOD 140 is disposed with respect to spherical lens 138 so that p-polarized collimated light beams "b" emanating from lens 138 are Bragg matched to first AOD 140. First AOD 140 is positioned to receive the light beams "b" from lens 138 and to pass a number of undeflected, p-polarized, undiffracted light beams "b" and a number of angularly deflected, i.e., diffracted, doppler-shifted light beams denoted in FIG. 2 as "b+1". First AOD 140 causes a +1, i.e. a first order positive doppler shift, in the diffracted light beams "b+1". The positive doppler shift in the deflected p-beam is equal to the frequency of the microwave signal that drives first AOD 140. In a typical arrangement, about 90% of the light beams entering first AOD 140 pass through the device undiffracted (known as DC light beams) and the remainder are diffracted.

First AOD 140 is optically coupled to a 1:1 imaging system 160, which in turn is coupled to a second AOD 142. Imaging system 160 comprises a first imaging lens 162 and a second imaging lens 164, which are disposed so that the "b" and the "b+1" light beams passing from first AOD 140 to second AOD 142 go through the imaging system and are incident at a Bragg angle on second AOD 142. A 90 degree polarization rotator 144 (e.g., a half wave plate) is disposed between first and second imaging lenses 162, 164 so that the undiffracted "b" light beams exiting from first imaging lens 162 enter polarization rotator 144 and undergo a polarization shift to the opposite linear polarization, e.g., from p-polarized light to s-polarized light. The now s-polarized "b" light beams then pass into second imaging lens 164, which is positioned so that these light beams are deflected to be Bragg matched (i.e., incident at the Bragg angle) to second AOD 142.

Second AOD 142 is a device similar to first AOD 140 and comprises a transducer 143 which is electrically coupled to microwave drive system 200. Second AOD 142 is oriented in the optical architecture so that the s-polarized "b" light beams that are diffracted in second AOD 142 experience a −1, or negative first order, doppler shift. These diffracted, negative doppler shifted light beams are indicated in FIG. 2 by the designation "b−1". A light absorber 145 is optically coupled to second AOD 142 and disposed so that the "b" light beams that pass through second AOD 142 undiffracted are absorbed by light absorber 145. The first order positive doppler shifted "b+1" light beams (which are p-polarized) pass through imaging system 160 so that the majority of these light beams pass through second AOD 142 essentially undiffracted, and those beams that are diffracted in second AOD 142 are absorbed by light absorber 145.

In accordance with this invention, microwave drive system 200 comprises a microwave generator 210 and a variable frequency controller 220 which are both coupled to a signal mixer 230. Signal mixer 230 is coupled to a signal splitter 240, and signal splitter 240 is further coupled to a first sideband filter 252 and to a second sideband filter 254, which provide the signals to drive first AOD 140 and second AOD 142 respectively.

Microwave generator 210 produces a microwave signal $f_{gen}$ which has a frequency corresponding to the desired transmitted electromagnetic radiation carrier frequency $f_c$. The signal ($f_{gen}$) from microwave generator 210 corresponds to the desired carrier frequency value $f_c$ in that it typically has one-half the frequency of the desired value $f_c$ as the heterodyne detection of the pairs of positive and first order negative doppler-shifted light beams (as discussed below) enable the base frequency of the two beams to be added to produce the desired carrier frequency value $f_c$, which is typically in the GHz range when using GHz band AODs; RF band AODs can alternatively be used in optical architecture 150A, with frequency up-conversion via mixers to the microwave GHz band. Microwave generator 210 advantageously is adapted to controllably vary the frequency of signal $f_{gen}$ so that the carrier frequency of the transmitted electromagnetic energy can be changed as desired dependent upon operational considerations.

Variable frequency controller 220 is phased locked with microwave generator 210 and generates a control signal frequency $f_o$ that is mixed with signal $f_{gen}$ in mixer 230. Control signal frequency $f_o$ is selected to produce the desired first and second sideband drive signals for first and second AODs respectively. The application of these drive signals cause the doppler shift imparted to the positive first order deflected beams in first AOD 140 to correspond to, for example, the upper sideband of the mixed signal frequencies $f_o$ and $f_{gen}$, and the doppler shift imparted to the negative first order beams to correspond to the lower sideband of the mixed signal $f_o$ and $f_{gen}$. Depending on design preference, the lower sideband drive signal can alternatively be used to drive first AOD 140 and the upper sideband drive signal can be used to drive second AOD 142. Varying the selected control frequency changes the upper and the lower sideband frequencies in the respective drive signals for the first and second AODs, causing minor changes in the deflection angles of the $b^{+1}$ and $b^{-1}$ beams. In a typical system, variable frequency controller 220 comprises a synthesized signal generator and produces signals having a frequency range of about 10 KHz to 100 MHz.

In mixer 230 signals $f_{gen}$ and $f_o$ are mixed together to produce a drive signal $f_d$ which exhibits double sideband characteristics, that is frequencies of both ($f_{gen}+f_o$) and ($f_{gen}-f_o$). In accordance with this invention, the mixed drive signal $f_d$ passing from mixer 230 next enters signal splitter 240 in which the mixed drive signal is split and coupled respectively to first sideband filter 252 and second sideband filter 254. First sideband filter 252 is chosen so that it passes only one sideband (that is, the upper or the lower sideband) of the mixed drive signal $f_d$, and second sideband filter 254 is chosen so that it passes the other sideband of the double sideband mixed drive signal. For example, first sideband filter 252 commonly passes the upper sideband ($f_{gen}+f_o$) to produce first sideband drive signal $f_{d1}$; in this arrangement second sideband filter 254 is designed to pass the lower sideband ($f_{gen}-f_o$) to produce second sideband drive signal $f_{d2}$. The first and second sideband filters are each adapted to pass frequencies in a range corresponding to the range of control frequency $f_o$ (i.e., from $f_o=0$ to $f_o$ max) used to generate the desired phase shifts (angular deflections) in the respective positive and negative doppler shifted diffracted light beams.

Thus the first order positive doppler shifted ($b^{+1}$) light beams that emerge from first AOD 140 experience a deflection which is a function of the doppler shift that corresponds to the first sideband of the mixed signal of the desired carrier signal frequency $f_{gen}$ and the selected variable control frequency $f_o$, for example, the upper sideband ($f_{gen}+f_o$). The first order negative doppler shifted beams ($b^{-1}$) emerging from second AOD 142 experience a deflection which is a function of the doppler shift that corresponds to the second sideband of the mixed signal $f_{gen}$ and $f_o$, which, in the example used herein, is the lower sideband ($f_{gen}-f_o$).

In accordance with this invention, as a result of the slightly different deflection angles imparted to the $b^{+1}$ and $b^{-1}$ light beams, the $b^{+1}$ and $b^{-1}$ light beams do not pass along exactly colinear paths as they emerge from AOD 142, but instead pass along paths that are almost colinear. As used herein, "almost colinear" refers to beams that are traveling along paths that are oriented within about 1° to 2° of each other. This slight difference in paths is used to generate an interference fringe pattern, along the beam deflection axis, between the beams which, on detection by a heterodyne device as described below, is used to control scanning along one axis of the antenna array.

Thus, both the first order positive and first order negative doppler shifted light beams, which are respectively p-polarized and s-polarized, exit second AOD 142 on almost colinear paths. Each combination of one first order positive and one first order negative doppler shifted light beam passing along the same path form an optical signal pair. The plurality of optical signal pairs are arranged in a two-dimensional pattern for processing that corresponds, in each axis of the two-dimensional array, to the number of signals needed to drive the antenna array.

Second AOD 142 is optically coupled to a beam expander 146, which in turn is optically coupled to a spatial light modulator (SLM) 147. SLM 147 typically comprises a two-dimensional array of liquid crystal pixels arranged in a pattern corresponding to the two dimensional processing pattern, with the number of pixels in the array corresponding to the number of antenna elements driven by independent beamforming signals. Thus the total number of optical signal pair beams into which beam expander 146 must separate the light emerging from second AOD 142 is determined by the number of antenna elements or subarrays of antenna elements to be separately driven by optical signal processing system 150, and the two dimensinal array in the spatial light modulator corresponds to the number and spatial arrangement of the two-dimensional processing pattern of optical signal pairs emerging from beam expander 146.

The two-dimensional liquid crystal array in SLM 147 advantageously comprises nematic liquid crystals. The liquid crystals (LCs) are individually controlled to selectively adjust the phase of light beams having a predetermined linear polarization. By way of example and not limitation, the orientation of the LC directors in each LC cell is along the p-polarized beam, i.e., the same polarization orientation as light generated by laser source 132. Thus, only the +1 (the positive first order) diffracted p-polarized beam in each optical signal pair undergoes phase-shifts induced by the electrically controlled birefringence of the LC pixels in SLM 147, and the degree of the phase shift is selectively determinable by the control voltage applied to each pixel. Each LC pixel is separately controllable by array control computer 105, and changing the control voltage applied to the respective LC pixels allows analog control of the phase shift experienced by the p-polarized light beam in each optical signal pair. The −1 diffracted order (first order negative doppler shifted) s-polarized beam in each optical signal pair experiences only the ordinary index of refraction in the rotating LC molecules in each respective pixel, and therefore does not undergo a voltage-dependent phase shift when the control voltage on the LCs is changed. The SLM thus provides a means of altering the phase of selected ones of light beams of a particular polarization that pass therethrough and thus that can be used to generate optical interference patterns detectable with heterodyne detection. This SLM-based interference pattern generation is independent from the acousto-optic based interference pattern generation discussed above resulting from driving the first and second AODs with first and second sideband drive signals respectively.

SLM 147 is optically coupled to a beam-combining polarizer 148 such as a sheet polarizer or bulk optics polarizer that is oriented at 45 degrees to the p- and s-polarization directions. This orientation of polarizer 148 enables parallel components from the p- and s-beams in each optical signal pair to be combined. An input port coupling device 149 for a 2-D single mode fiber array 170 is optically coupled to sheet polarizer 148 and disposed so that each of the plurality of phase-shifted light beams emanating from the different pixels in the two-dimensional LC array 147 are incident on a respective one of the optical fibers in 2-D single mode fiber array 170. The arrangement of the 2-D fiber array corresponds to the 2-D processing pattern in which the plurality of optical beam pairs are arranged. Input port coupling device 149 is aligned in the same plane as SLM 147, and each fiber in 2-D fiber array 170 is centered on a respective one of the pixels in SLM 147. Coupling device 149 provides the appropriate magnification or demagnification between the 2-D fiber array and SLM 147 (e.g., beam expansion may be required if the minimum distance between fibers in 2-D array 170 is greater than the distance between pixels in SLM 147) to allow the interference pattern between optical signal pairs to be picked up by fiber array 170 and directed to transceiver 180. A multi-fiber array link 171 is coupled to fiber array 170 and transceiver module 180 so as to carry the optical signals therebetween.

In accordance with this invention, transceiver module 180 comprises a heterodyne detection system for the optical signals, for example a photodiode array 182, and further comprises a transmit/receive signal coupler array 184 and a signal adder 186. Each fiber in multi-fiber optic array link 171 is terminated in a respective photodiode in photodiode array 182, in which the photodiodes are arranged in a pattern to correspond to the two-dimensional processing pattern. Each photodiode detects the interference between the +1 and −1 doppler shifted beams of the respective optical signal pairs and generates a corresponding electrical beamforming signal. The heterodyne detection of the optical interference pattern in the optical signal pairs causes the electrical beamforming signals generated by the photodiodes to have a frequency that is twice the drive frequency of the AODs. Photodiode array 182 is electrically coupled to transmit/receive coupler array 184, which couples the respective beamforming signals to the antenna array in the transmit mode and combines the detected signals received from the antenna array in the receive mode with the desired beamforming signal to generate in-phase signals from each of the antenna elements to be added by a signal adder 186, which in turn is coupled to post processing display and analysis system 190.

In operation, the optical signal processing system of this invention enables independent control of scanning along two orthogonal axes of the antenna array. In each transmit/receive cycle, one set of optical interference patterns between the positive and the negative doppler shifted beams in each optical signal pair is generated as a result of respectively driving the first and second AODs with the upper and lower sideband of the mixed drive and control frequency. The amount of angular shift between the beams, and hence an interference or phase pattern which is detected by the heterodyne detection device, is a function of the magnitude of the frequency difference between the first and second sideband drive signals. A second set of phase-based interference patterns is controlled by setting of control voltages to control each pixel in spatial light modulator 147 so that light beams of the appropriate polarization in each optical signal pair passing therethrough undergo a selected phase shift.

The relative phase shifts in the plurality of optical signal pairs determine the direction in which a transmit pulse will emanate from the phased array antenna system, and the direction from which a return signal may be detected. Typically the control frequency in the microwave drive system 200 provides very fast scanning because control signal frequency $f_o$ present in the drive signal in each AOD crystal can rapidly cause the optically diffracted beams to be angularly deflected, thus causing a change in the interference pattern between the light beams that, when detected by heterodyne means and converted to electrical signals, controls the antenna beam along one axis, say elevation. The SLM, which provides slower scan rates due to the switching times required for resetting the liquid crystal pixels in the array, is typically used to control antenna beam scan in azimuth. Use of relatively high ($\approx 20$ V) nematic liquid crystal control voltages to control the spatial light modulator results in liquid crystal phase shift (0°−180°) switching times of about 1 msec. Typical slow scanning radars, such as mechanically scanned air traffic control radars, rotate at about 5 rpm, which corresponds to a 100 msec transmit-receive beam dwell time for a 3-degree antenna beamwidth. With a 1 msec radar deadtime corresponding to the liquid crystal SLM setting time, only 1% of the beam dwell time is unavailable for scanning in any transmit-receive sequence, thus providing improved radar performance.

In the transmit mode, T/R signal coupler array 184 is set so that each appropriately phase-controlled microwave signal generated by the photodiode array actuates the appropriate antenna element to collectively generate the desired electromagnetic radiation pattern. In the receive mode, the same beamforming signals are mixed with the detected return signals from the antenna elements to generate, after electronic filtering, an input for the post processing system for display and analysis. This mixture of beamforming signals and return signals enables the phase array antenna system to "view" a particular angle of space with respect to the antenna array to determine the intensity of electromagnetic radiation of the desired frequency being received from that direction.

Additionally, the carrier frequency of the transmitted electromagnetic energy can be varied by changing the frequency of the signal generated by microwave generator 200. Thus the system of the present invention allows the carrier frequency to be optimized for a given application or to have "frequency hopping" capabilities to avoid jamming or the like.

The optical signal processing system of the present invention is reliable and rugged, the opto-electronic control providing precise, fast scanning capability with few moving parts. This system further allows accurate calibration of the antenna system to account for noise or variances in the system's electrical or optical components. This calibration is accomplished by establishing baseline LC pixel settings to obtain a given antenna output beam, for example all antenna elements radiating in phase. Optical processing control signals can then be added to the baseline LC settings to generate the desired electromagnetic beamforms from the antenna in accordance with the structure and methods disclosed above.

It will be readily understood by those skilled in the art that the present invention is not limited to the specific embodiments described and illustrated herein. Many variations, modifications and equivalent arrangements will now be apparent to those skilled in the art, or will be reasonably suggested by the foregoing specification and drawings, without departing from the substance or scope of the invention. Accordingly, it is intended that the invention be limited only by the spirit and scope of the appended claims.

What is claimed is:

1. A phased array antenna system comprising:
    an antenna array including a plurality of antenna elements;
    an optical signal processing system for generating optical control signals to determine transmit and receive electromagnetic radiation beam patterns of said antenna array, said optical control signals comprising a plurality of optical output signal pairs collectively arranged in a two-dimensional processing pattern, each of said output signal pairs comprising a first order positive doppler-shifted light beam and a first order negative doppler-shifted light beam;
    a transceiver module coupled to said optical signal processing system and to said antenna array and including heterodyne detection means for converting said optical output signal pairs to electrical beamforming signals for controlling the transmit and receive electromagnetic patterns of said antenna array, said heterodyne detection means having a detection pattern corresponding to said two-dimensional processing pattern; and
    a source of coherent, polarized light optically coupled to said optical signal processing system;
    said optical signal processing system comprising:
        a microwave drive system;
        a first acousto-optic deflector (AOD) electrically coupled to said microwave drive system to receive therefrom a first sideband drive signal corresponding to a mixture of a selected carrier frequency and a selected variable control frequency;
        a second AOD electrically coupled to said microwave drive system to receive therefrom a second sideband drive signal corresponding to said mixture of said carrier frequency and said variable control frequency; and
        a spatial light modulator optically coupled to receive said optical control signals passing from said second AOD and adapted to selectively control the relative phase between said first order positive and first order negative doppler shifted light beams in each respective one of said optical signal pairs;
        said optical signal processing system being adapted to simultaneously and independently control scanning along respective first and second axes of said antenna array such that beamforming along one of said axes is determined by drive signals applied to said first and second AODs and beamforming along the other of said axes is determined by control voltages applied to said spatial light modulator.

2. The system of claim 1 wherein one of said first and second sideband signals corresponds to the upper sideband and the other of said first and second sideband signals corresponds to the lower sideband of said mixture of signals corresponding to said selected carrier frequency and said selected variable control frequency.

3. The system of claim 1 wherein said heterodyne detection means comprises a plurality of photodetectors arranged in an array corresponding to said detection pattern such that said photodiodes are disposed to detect optical interference patterns in each of said optical signal pairs.

4. The system of claim 3 wherein said array of photodetectors is disposed such that optical interference patterns resulting from use of said variable control frequency to drive said first and second AODs control generation of electrical beamforming signals in said transceiver along said first axis of said antenna array, and interference patterns resulting from phase modulation in said spatial light modulator controls generation of electrical beamforming signals in said transceiver along said second axis of said antenna array, said first and second axes being orthogonal to one another.

5. The system of claim 4 wherein said first axis comprises an elevation axis and said second axis comprises an azimuth axis.

6. The system of claim 1 wherein said microwave drive system further comprises:
    at least one microwave source to generate a microwave signal corresponding to said selected carrier frequency;
    a variable frequency controller to generate a sideband phase control signal having the selected variable control frequency;
    a microwave signal mixer coupled to said at least one microwave source and said variable frequency controller to generate a mixed signal of said microwave signal and said sideband phase control signal;
    a microwave signal splitter coupled to said microwave signal mixer to receive said mixed signal therefrom and to split said mixed signal into a plurality of substantially identical signals;
    a first sideband filter coupled to said microwave signal splitter to receive one of the plurality of split mixed signals and being adapted to pass said first sideband drive signal to said first AOD; and
    a second sideband filter coupled to said microwave signal splitter to receive another of the plurality of split mixed signals and being adapted to pass said second sideband drive signal to said second AOD.

7. The system of claim 6 further comprising a 1:1 imaging system having a first and a second imaging lens and disposed so that light beams passing from said first AOD to said second AOD pass therethrough.

8. The system of claim 7 wherein:
said first AOD is disposed with respect to the light beams incident from said light source such that said light beams are Bragg matched to said first AOD and so that a portion of light passing therethrough is diffracted and undergoes a first order positive doppler shift corresponding to said first sideband drive signal, and the remaining portion of light passing through said first AOD is undiffracted; and
said second AOD is disposed with respect to said 1:1 imaging system so that the undiffracted light emerging from said first AOD is Bragg matched to said second AOD and undergoes a first order negative doppler shift corresponding to said second sideband drive signal and further so that a portion of said first order positive doppler shift light emerging from said first AOD passes through said second AOD undiffracted;
said second AOD being further positioned with respect to said imaging system so that respective positive and first order negative doppler shifted light beams emanate from said second AOD along almost collinear paths.

9. The system of claim 8 wherein said acousto-optic means further comprises a 90° polarization rotator disposed at the focal point between said first and second imaging lenses of said undiffracted light beams such that said undiffracted light beams emerging from said first AOD are orthogonally linearly polarized with respect to said diffracted beams emerging from said first AOD.

10. The system of claim 9 wherein said spatial light modulator comprises an array of liquid crystals.

11. The system of claim 10 further comprising:
a beam expander optically coupled between said second AOD and said spatial light modulator such that said positive and first order negative doppler shifted light beams emerge from said beam expander in a plurality of optical signal pairs, each of said pairs comprising one positive and one first order negative doppler shifted optical signal;
a beam-combining polarizer optically coupled to said spatial light modulator and disposed to uniformly polarize each of said optical signal output pairs that emerge from said spatial light modulator;
an optical coupling device coupled said beam combining sheet polarizer; and
a two-dimensional fiber optic array disposed to receive said optical signal output pairs from said optical coupling device and to optically couple said signal output pairs to said transceiver module.

12. The system of claim 11 wherein said heterodyne detection means for converting optical output signal pairs to said electrical beamforming signals comprises a photodiode array.

13. The system of claim 1 wherein said microwave source comprises a microwave generator capable of generating microwave drive signals having a frequency in a selected range.

14. An optical signal control system comprising:
a source of coherent, polarized light;
acousto-optic means for generating a plurality of optical signal pairs collectively arranged in a two-dimensional processing pattern;
first and second modulating means to control the relative phase of light beams in each of said optical signal pairs; and
heterodyne means for detecting optical interference resulting from the relative phase difference between the respective light beams comprising each of said optical signal pairs;
said first modulating means being adapted to control the relative phase of light beams in optical signal pairs along a first axis of said two-dimensional processing pattern and said second modulating means being adapted to control the relative phase of light beams in optical signal pairs along a second axis of said two-dimensional processing pattern; said first and second modulating means being further adapted to simultaneously and independently modulate the phase of said light beams along said first and second axes respectively.

15. The system of claim 14 wherein said each of said optical signal pairs comprises two light beams, one of said beams in each pair having a first order positive doppler shift corresponding to a first sideband drive signal and one of said beams in each pair having a first order negative doppler shift corresponding to a second sideband drive signal, the first order positive doppler shifted beam and the first order negative doppler shifted beams in each of said beam pairs passing from said acousto-optic means on almost colinear paths, said first modulating means comprising a drive system coupled to said acousto-optic means to generate said first and second sideband drive signals from a selected drive frequency and a selected variable control frequency.

16. The system of claim 15 wherein said second modulating means comprises an optical phase modulating device coupled to said acousto-optic means and disposed to selectively delay the phase of one light beam of a selected polarization in each of said optical signal pairs.

17. The system of claim 16 wherein said acousto-optic means further comprises:
a first acousto-optic deflector (AOD) coupled to said drive system to as to be driven by said first sideband drive signal; and
a second AOD coupled to said drive system so as to be driven by said second sideband drive signal.

18. The system of claim 17 wherein:
one of said first and second sideband signals corresponds to the upper sideband and the other of said first and second sideband signals corresponds to the lower sideband of a mixture of said selected carrier frequency and said selected variable control frequency.

19. The system of claim 18 wherein said drive system comprises a microwave drive system coupled to said first and second AODs, said microwave drive system comprising:
at least one microwave source to generate a microwave signal corresponding to said selected carrier frequency;
a variable frequency controller to generate a sideband phase control signal having the selected variable control frequency;
a microwave signal mixer coupled to said at least one microwave source and said control signal source to generate a mixed signal of said microwave signal and said sideband phase control signal;
a microwave signal splitter coupled to said microwave signal mixer to receive said mixed signal therefrom and to split said mixed signal to form a plurality of substantially identical mixed signals;
a first sideband filter coupled to said microwave signal splitter to receive one of the plurality of split mixed signals and being adapted to pass said first sideband drive signal to said first AOD; and a second sideband filter coupled to said microwave signal splitter to receive another of the plurality of split mixed signals and being adapted to pass said second sideband drive signal to said second AOD.

20. The system of claim 19 wherein said acousto-optic means further comprises:

a 1:1 imaging system disposed in the path of any light beams passing between said first and second AODs; and a 90° polarization rotator optically coupled to said imaging system and disposed so as to orthogonally polarize undiffracted light beams that exit said first AOD such that the light beams in each optical signal pair are orthogonally linearly polarized.

21. The system of claim 20 wherein said 1:1 imaging system comprises first and second imaging lenses, said first and second lenses being disposed between said first and second AODs so that:

undiffracted light beams that emerge from said first AOD and pass through said first and second imaging lenses are Bragg matched to said second AOD so that a portion of said undiffracted light beams undergo a first order negative doppler shift corresponding to said second sideband drive signal in said second AOD; and the first order positive doppler shifted light beams that emerge from said first AOD and pass through said first and second imaging lenses are Bragg matched to said second AOD so that a portion of said positive first order light beams emerge from said second AOD undiffracted on an almost colinear path with said first order negative doppler shifted beams.

22. The system of claim 21 wherein said second modulating means comprises a liquid crystal spatial light modulator (SLM) having a two-dimensional array of pixels and disposed so that each of said optical signal pairs that emerge from said second AOD pass through a respective one of said pixels.

23. The system of claim 14 wherein said heterodyne means for detecting interference comprises an array of photodiodes arranged in a detection pattern corresponding to said two-dimensional processing pattern, each respective one of said photodiodes being coupled to receive a respective one of the optical signal pairs from said SLM, each respective one of the photodiodes in said array corresponding to a respective one of the pixels in said SLM.

24. A method of processing optical signals comprising the steps of:

passing a plurality of coherent, linearly polarized light beams through an acousto-optic system to generate a plurality of optical signal pairs arranged in a two-dimensional processing pattern, each of said pairs comprising two light beams, one of said light beams having a first order positive doppler shift and one of said light beams having a first order negative doppler shift;

driving said acousto-optic system with a drive system so that the first order positive doppler shift of respective ones of said light beams corresponds to a first sideband of a mixture of a drive frequency and a selected variable control frequency, and the first order negative doppler shift of respective ones of said light beams corresponds to a second sideband of a mixture of said drive frequency and said selected variable control frequency so that selected relative phase differences are generated between the light beams in each optical signal pair along a first axis of said two-dimensional processing pattern;

in each of said optical signal pairs, further selectively shifting the phase of a predetermined one of said light beams having a selected linear polarization with respect to the other light beam in said each optical signal pair along a second axis of said two-dimensional processing pattern; and detecting optical interference between the relative phases of the positive and first order negative doppler shifted light beams in each of said optical signal pairs and generating an electrical signal corresponding to the detected interference for each of said optical signal pairs;

the generation of phase differences in optical signals along said first axis and said second axis being performed independently of and simultaneously with one another.

25. The method of claim 24 wherein the step of driving said acousto-optic system further comprises the steps of:

generating a carrier drive signal;

mixing said carrier drive signal with a variable control signal having a selected variable control frequency;

splitting the mixed carrier drive signal and variable control signal; and passing one of the split mixed carrier drive signals and variable control signals through a first sideband filter and passing the other of the split mixed carrier drive signal and variable control signal through a second sideband filter.

26. The method of claim 25 wherein the step of passing said plurality of light beams through an acousto-optic system further comprises the steps of:

directing said plurality of light beams onto a first acousto-optic deflector (AOD) at the Bragg angle of said first AOD to generate an undiffracted set of light beams and a first order positive doppler shifted set of light beams passing from said first AOD;

directing said set of undiffracted light beams onto a second AOD at a Bragg angle so as to generate a first order negative doppler shifted set of light beams, said first and second AODs being driven by a common drive frequency; and directing said first order positive doppler shifted set of light beams onto said second AOD at a Bragg angle therefor so that the majority of the first order positive diffracted beams pass through undiffracted and so that respective ones of said first order positive and said first order negative doppler shifted light beams pass from said second AOD almost colinear with one another to form said optical signal pairs.

27. The method of claim 26 wherein the step of driving said acousto-optic means further comprises the steps of:

driving said first AOD with the split mixed carrier drive signals and variable control signal passing from said first sideband filter and driving said second AOD with the split mixed carrier drive signal and variable control signal passing from said second sideband filter.

28. The method of claim 27 wherein the step of detecting interference between relative phases of light beams in said optical signal pairs comprises directing respective ones of said optical signal pairs into respective optical detectors arranged in an array corresponding to said two-dimensional processing pattern and generating a plurality of respective electrical beamforming signals.

29. The method of claim 28 further comprising the step of selectively changing said variable control frequency to adjust the relative phase of respective ones of the light beams along said first axis of said two-dimensional pattern.

30. The method of claim 24 wherein the step of selectively shifting the phase of a predetermined one of said light beams of a selected linear polarization further comprises the step of passing said plurality of optical signal pairs through a spatial light modulator having an array of individually controllable pixels arranged corresponding to said two-dimensional processing pattern.

* * * * *